United States Patent
Truthseeker

(10) Patent No.: US 11,336,221 B2
(45) Date of Patent: May 17, 2022

(54) WIRE RECEIVER FOR SECURING WIRES OF SOLAR ARRAY

(71) Applicant: TECSI Solar, Inc., El Sobrante, CA (US)

(72) Inventor: Samuel Marcus-Flack Truthseeker, El Sobrante, CA (US)

( * ) Notice: Subject to any disclaimer, the term of this patent is extended or adjusted under 35 U.S.C. 154(b) by 14 days.

(21) Appl. No.: 16/717,810

(22) Filed: Dec. 17, 2019

(65) Prior Publication Data

US 2020/0127599 A1 Apr. 23, 2020

Related U.S. Application Data

(63) Continuation-in-part of application No. 16/087,531, filed as application No. PCT/US2017/024196 on Mar. 25, 2017, now Pat. No. 11,047,599.

(60) Provisional application No. 62/780,662, filed on Dec. 17, 2018, provisional application No. 62/313,375, filed on Mar. 25, 2016.

(51) Int. Cl.
*H02S 30/00* (2014.01)

(52) U.S. Cl.
CPC .................................. *H02S 30/00* (2013.01)

(58) Field of Classification Search
CPC ......... Y02E 10/47; Y02E 10/50; H02S 20/23; H02S 20/24; H02S 30/00; H02S 40/30; Y02B 10/10; F24S 25/33; F24S 25/61; F24S 25/617; F24S 25/634; F24S 2025/014; F24S 2025/02
See application file for complete search history.

(56) References Cited

U.S. PATENT DOCUMENTS

| | | | |
|---|---|---|---|
| 5,505,788 | A | 4/1996 | Dinwoodie |
| RE38,988 | E | 2/2006 | Dinwoodie |
| 9,166,522 | B1 | 10/2015 | Zvanut et al. |
| 2011/0088740 | A1 | 4/2011 | Mittan et al. |
| 2012/0061337 | A1 | 3/2012 | Seery et al. |
| 2012/0272613 | A1 | 11/2012 | Cusson et al. |
| 2013/0087186 | A1 | 4/2013 | Pelman et al. |

(Continued)

FOREIGN PATENT DOCUMENTS

| | | |
|---|---|---|
| WO | 2009150466 A2 | 12/2009 |
| WO | 2011046578 A1 | 4/2011 |

OTHER PUBLICATIONS

International Search Report and Written Opinion received in International Patent Application No. PCT/US2017/024196, dated Sep. 25, 2017, in 16 pages.

(Continued)

*Primary Examiner* — Mayla Gonzalez Ramos
(74) *Attorney, Agent, or Firm* — Armstrong Teasdale LLP

(57) ABSTRACT

A solar array includes a solar module and a support structure for the solar module. The support structure includes a support member. The solar module is mounted on the support structure such that the solar module is positioned at least partially above the support member. The solar array also includes a wire receiver for securing wires to the solar module or the support member. The wire receiver includes a wire insert slot sized for receiving wires, a wire transition slot connected to the wire insert slot, and a catch adapted to inhibit movement of the wires. The wire insert slot and the wire transition slot are sized and arranged for the wires to be inserted into the wire insert slot and positioned around the catch.

16 Claims, 24 Drawing Sheets

(56) References Cited

U.S. PATENT DOCUMENTS

| | | |
|---|---|---|
| 2013/0118099 A1 | 5/2013 | Scanlon |
| 2013/0140416 A1 | 6/2013 | West et al. |
| 2013/0174891 A1* | 7/2013 | Tseng .................... F24S 25/50 |
| | | 136/251 |
| 2013/0276867 A1* | 10/2013 | Wildes ................. F24S 25/636 |
| | | 136/246 |
| 2014/0061396 A1 | 3/2014 | Magno, Jr. et al. |
| 2014/0158184 A1 | 6/2014 | West et al. |
| 2016/0336895 A1 | 11/2016 | Wildes et al. |
| 2016/0359451 A1* | 12/2016 | Mao .................. H01L 31/02013 |
| 2017/0373632 A1 | 12/2017 | Bauer et al. |
| 2018/0138857 A1* | 5/2018 | Davies .................... H02S 40/34 |
| 2019/0006983 A1 | 1/2019 | Goldberg et al. |

OTHER PUBLICATIONS

Sunpower T5 Solar Power Roof Tile brochure, htttps://pdf.directindustry.com/pdf/sunpower-corporation/sunpower-t5-solar-roof-tiles/54792-210029.html, printed from website Aug. 26, 2021, 2 pages.

Photos of Sunpower T5 product, taken Aug. 25, 2021 by Samuel Marcus-Flack Truthseeker, 2 pages.

* cited by examiner

WIRE RECEIVER FOR SECURING WIRES OF SOLAR ARRAY

CROSS-REFERENCE

This application claims priority to U.S. Provisional Patent Application Ser. No. 62/780,662, filed on Dec. 17, 2018, and to U.S. patent application Ser. No. 16/087,531, filed on Sep. 21, 2018, which is a National Stage application of International Application No. PCT/US2017/024196, filed on Mar. 25, 2017, which claims priority to U.S. Provisional Application No. 62/313,375, filed on 25 Mar. 2016, the entire contents and disclosures of which are hereby incorporated by reference in their entirety.

FIELD

This disclosure generally relates to wire receivers and, more specifically, to wire receivers for securing power and communication wires of a solar array.

BACKGROUND

Solar modules convert solar energy into other forms of useful energy (e.g., electricity or thermal energy). Such modules are typically positioned above an underlying structure surface on a frame or rack. The solar modules are often connected and arranged to form an array. Wires or cables extend from each solar module to connect the solar modules together and to connect the solar modules to remote electronics. Sometimes, the wires are secured to the solar array using clips or ties. However, the clips and ties are separate from other components of the solar array and can increase the cost and time required to install the solar arrays. For example, the installer may have difficulty in properly securing the wires using the clips and ties. In addition, the installer may not be able to identify locations on the solar array to properly secure the wires. Moreover, the clips or ties may break or otherwise fail and allow the wires to become unsecured after installation.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a solar array includes a solar module and a support structure for the solar module. The support structure includes a support member. The solar module is mounted on the support structure such that the solar module is positioned at least partially above the support member. The solar array also includes a wire receiver for securing wires to the solar module or the support member. The wire receiver includes a wire insert slot sized for receiving wires, a wire transition slot connected to the wire insert slot, and a catch adapted to inhibit movement of the wires. The wire insert slot and the wire transition slot are sized and arranged for the wires to be inserted into the wire insert slot and positioned around the catch.

In another aspect, a method of assembling a solar array includes mounting a solar module on a support structure including a support member. The solar module extends at least partially above the support member. The method also includes connecting wires to the solar module and securing the wires in a wire receiver. The wire receiver includes at least one slot and a catch extending across the at least one slot. The catch is adapted to inhibit movement of the wires.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

The term photovoltaic may be abbreviated as "PV". As used herein, the term "PV laminate" refers to any laminate that may be used to generate electricity from solar rays. The term "PV module", "module", or "module assembly" refers to a PV laminate and may or may not include a mounting or support structure such as a frame and/or discrete mounting elements. The term "PV array" or "solar array" refers to a group of PV modules assembled as part of the same electricity generation system.

As used herein, the phrase "photovoltaic wires" refers to wires that convey electrical current for a solar array. Each wire may include at least one conductor surrounded by an insulation material. The photovoltaic wires may convey alternating current (AC) and/or direct current (DC). In addition, the following embodiments may also be used for data wires as well as electrical wires or pneumatic or hydraulic hoses required for the drive mechanisms of moving structures such as the motors for solar trackers.

Embodiments described below include photovoltaic (PV) modules and mounting systems for the PV modules. For example, some embodiments include PV modules coupled together into a contiguous and interlocked ballasted array. The PV modules may be mounted to a surface (such as a roof). The PV modules may be supported on the surface by a support structure. Embodiments of the described system include a built-in wire management device that secures photovoltaic wires.

Figure 13:
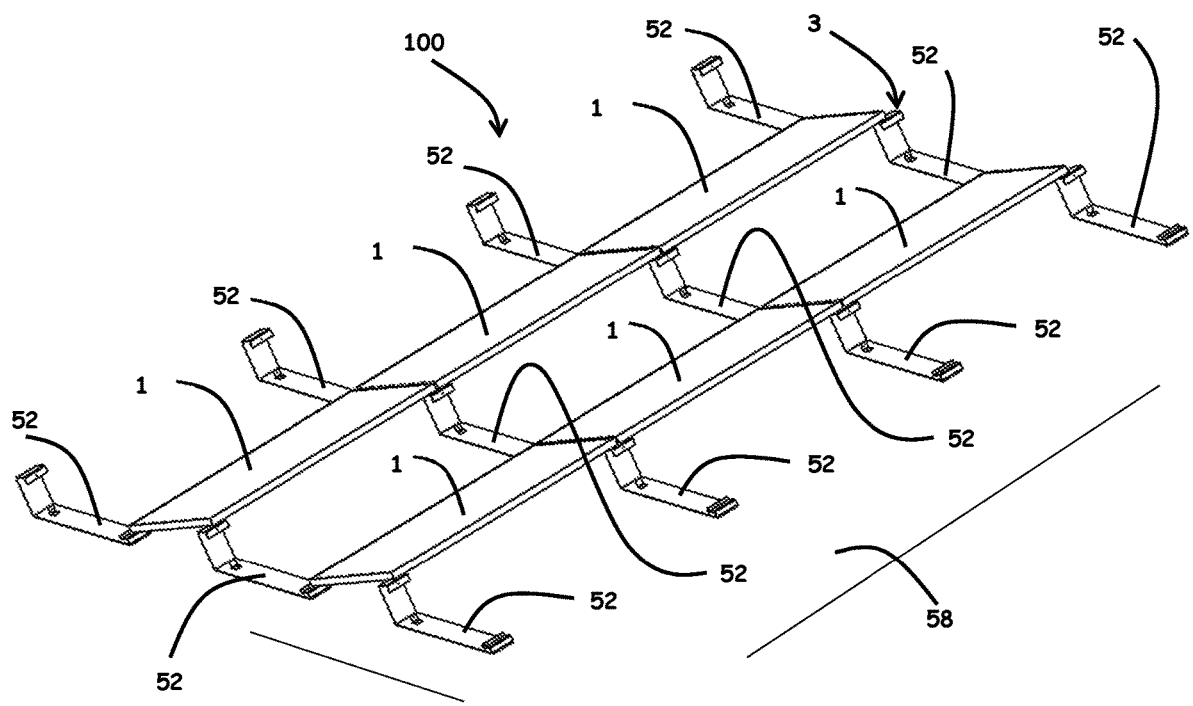
FIG. 13 is a perspective view of a portion of an example solar array.
Figure 18:
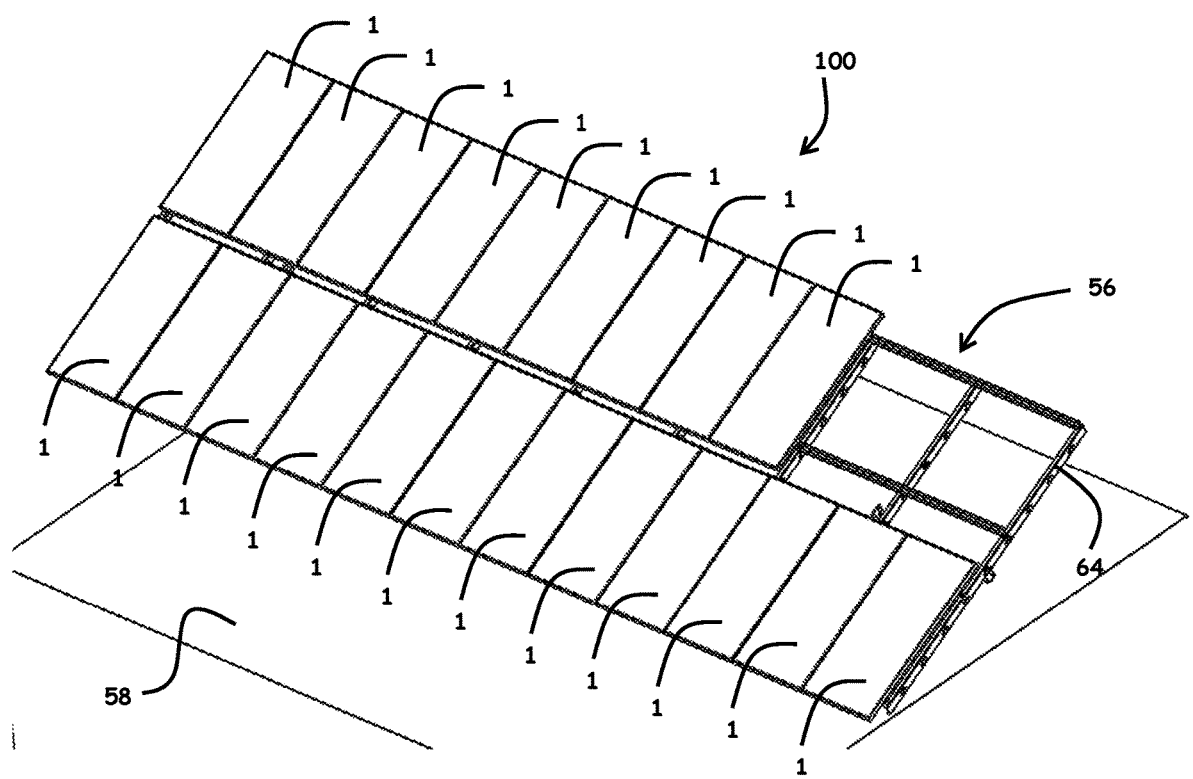
FIG. 18 is a perspective view of a portion of another example solar array, the solar array includes wire receivers on a support structure of the solar array.

Referring initially to FIG. 13, a PV array 100 of one embodiment includes modules 1 mounted on supports 52 on a surface of a structure. The structure may be, for example, a building having a fat roof or any other structure suitable for mounting solar modules. In other embodiments such as the embodiment shown in FIG. 18, the PV array may be installed on the ground or on any surface and may include any suitable support structure. For example, FIGS. 13 and 18 show examples of PV arrays including support structures 3, 56. In other embodiments, the PV array 100 may include any suitable support structures.

The module 1 includes a laminate and an integrated support structure or frame supporting the laminate. In some embodiments, clips or bolts attach the module 1 to the support structures 3, 56 and/or to the surface of a structure. The laminate includes a top surface, a bottom surface, and edges extending between the top surface and the bottom surface. The laminate has a width and a length. In this embodiment, the laminate is rectangular shaped. In other embodiments, the laminate may have any suitable shape.

The support structures 3, 56 support the modules 1 and resist forces acting on the modules 1. For example, the support structures 3, 56 counteract downward forces from wind and snow and the gravitational forces on the modules 1. In addition, the support structures 3, 56 resist environmental upward forces acting on the modules, such as upward forces from wind. In other embodiments, the modules 1 may be supported in any manner that enables the modules 1 to operate as described.

Wire receivers 20, such as the wire receivers shown in FIGS. 14-24, may be located on the support structures 3, 56 and used to secure the photovoltaic electrical wires 8 (shown in FIGS. 2, 4, 6, 8, 10, 12) above the roof. In the illustrated embodiment, the wire receivers 20 are integrated into members of the support structures 3, 56. For example, the wire receivers 20 may be stamped, pressed, cut, or otherwise formed in the sides of rails of the support structures 3, 56 such that the wire receivers 20 are planar with the sides of support structures. Details of how the wires 8 are inserted and held in the wire receivers 20 are shown in FIGS. 2, 4, 6, 8, 10, 12.

Figure 1:
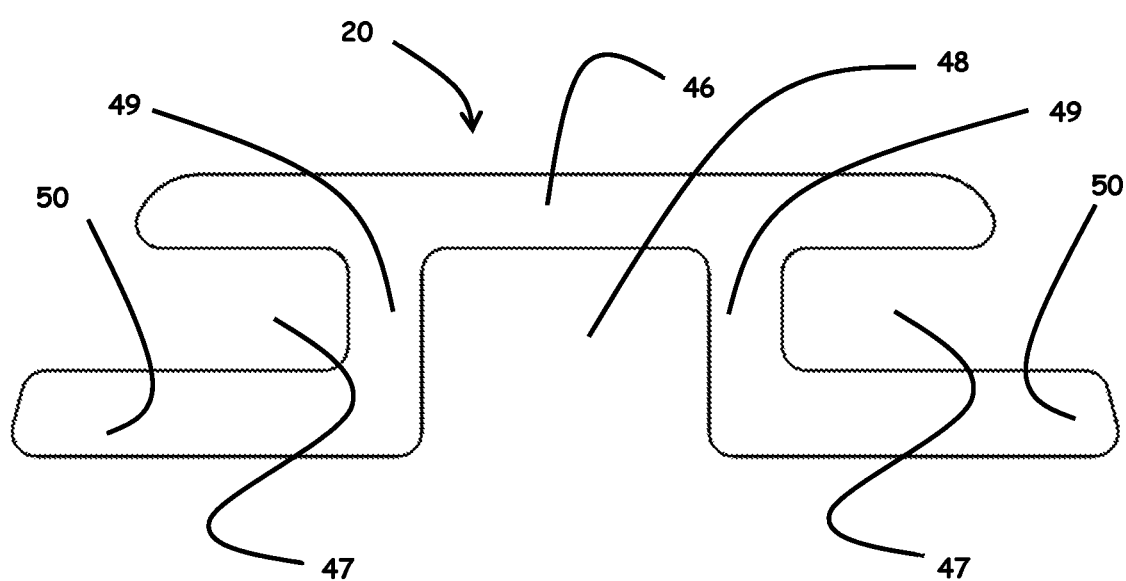
FIG. 1 is an enlarged schematic view of an example wire receiver, the wire receiver includes a wire insert slot, a transition slot, and a wire capture slot.

Referring to FIG. 1, in some embodiments, the wire receiver 20 includes slots 46, 49, 50 separated by fingers 47 and at least one catch or cleat 48. In this embodiment, the slots include a wire insert slot 46, one or more wire transition slots 49, and a wire capture slot 50. The wire insert slot 46 and the wire capture slot 50 extend horizontally, i.e., parallel to the mounting surface. In this embodiment, the wire insert slot 46 is above the wire capture slot 50. The wire transition slots 49 extend vertically, i.e., perpendicular to the mounting surface and the slots 46, 50, and connect the wire insert slot 46 and the wire capture slot 50. The cleat 48 extends across the capture slot 50, between the fingers 47, and generally divides the capture slot 50 into two portions.

Figure 2:
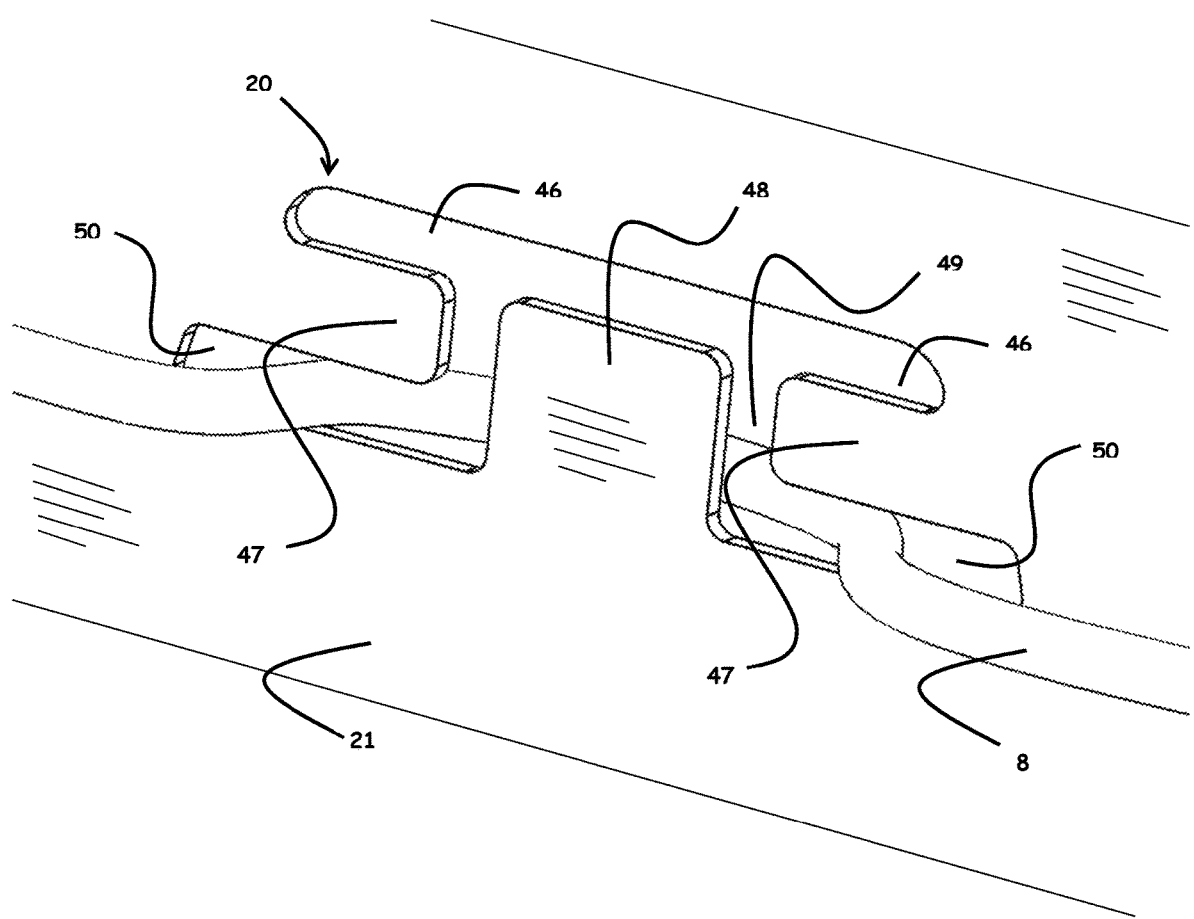
FIG. 2 is an enlarged perspective view of a photovoltaic wire secured in the wire receiver shown in FIG. 1.

With reference to FIG. 2, during assembly, the wire is inserted in the wire insert slot 46 and moved through the wire transition slots 49 into the wire capture slot 50. Fingers 47 extend horizontally along the wire insert slot 46 and the wire capture slot 50. The two fingers 47 guide the wire and secure the wire in the wire capture slot 50. In this embodiment, the fingers 47 and the cleat 48 are substantially planar and in the same plane generally as the side of the member of the support structure. In other embodiments, the wire receivers 20 may include any fingers 47 and/or cleat 48 that enable the wire receiver 20 to function as described. For example, in some embodiments, at least one of the fingers 47 and the cleat 48 may extend at an angle relative to the side of the member.

Also during assembly, the wire 8 is inserted in the slots 46, 49, 50 and positioned at least partially around the cleat 48 such that the cleat resists movement of the wire and suspends the wire above the surface 58. For example, a friction force is produced between the cleat 48 and the wire 8 to resist movement of the wire. In some embodiments, the wire receiver 20 is integrally formed on the support member. For example, in some embodiments, the support member is formed from plastic, such as polymer, in a mold and the wire receiver 20 is formed by the mold. In other embodiments, the support structure includes any wire receivers 20 that enable the support structure to function as described. For example, in some embodiments, the support member is metal and the support member is cut, pressed, or stamped to form the wire receivers 20. In addition, the wire receiver 20 could be produced in a separate part that is attached to a support member or other component of the solar array.

The wire receiver 20 may secure any wires 8 to the support structure. For example, in this embodiment, each wire receiver 20 holds up to three wires 8. However, the wire receiver 20 is scalable and may hold any number, including one, of the wires 8.

In the illustrated embodiment, the wire receiver 20 is formed along the sides of the member of the support structure and acts as an integrated wire management device. In other embodiments, the wire receiver 20 may be formed along the side of any beams, poles, braces, pylons, and/or other member of a support structure. In addition, the wire receiver 20 may be formed along the tops and/or bottoms of members of support structures. Moreover, the wire receiver 20 may be formed along components of the solar array that are not necessarily part of support structures such as wire trays.

The wire receivers 20 may be formed in a surface 21 (shown in FIG. 2) of the members at predefined distances that allow the wire receivers 20 to secure and support the wires along the support and maintain the wires above the ground. For example, a support member may include a substantially planar surface 21 defining the slots 46, 49, 50 of the wire receiver. At least one of the elements of the wire receiver 20 is planar with the planar surface 21. Specifically, the horizontal fingers 47 and the cleat 48 are substantially planar and are in the same plane as the planar surface 21. In some embodiments, at least one of the cleat 48 and the horizontal fingers 47 may extend at an angle relative to the planar surface. In other embodiments, the wire receiver 20 may be in any surface of the member and features may extend at any angle relative to the surface.

During installation, an unbroken wire 8 is bent and then slid into the wire insert slot 46. Then the wire 8 is pushed down through the transition slots 49 and fixed in the capture slot 50 as shown in FIG. 2. Accordingly, the wire 8 is captured in the wire receiver 20. Several wires 8 can be placed in one wire receiver 20. The wire receiver 20 reduces the need for independent wire clips or zip ties and decreases time and cost to install the modules 1.

FIGS. 3-12 show additional embodiments of wire receivers 20 that may be included in any of the support structures and solar arrays shown and described herein. The wire receivers 20 may be formed, pressed, cut, stamped, or provided in at least one member of the support structures in any manner that enables the wire receiver 20 to function as described herein.

Figure 3:
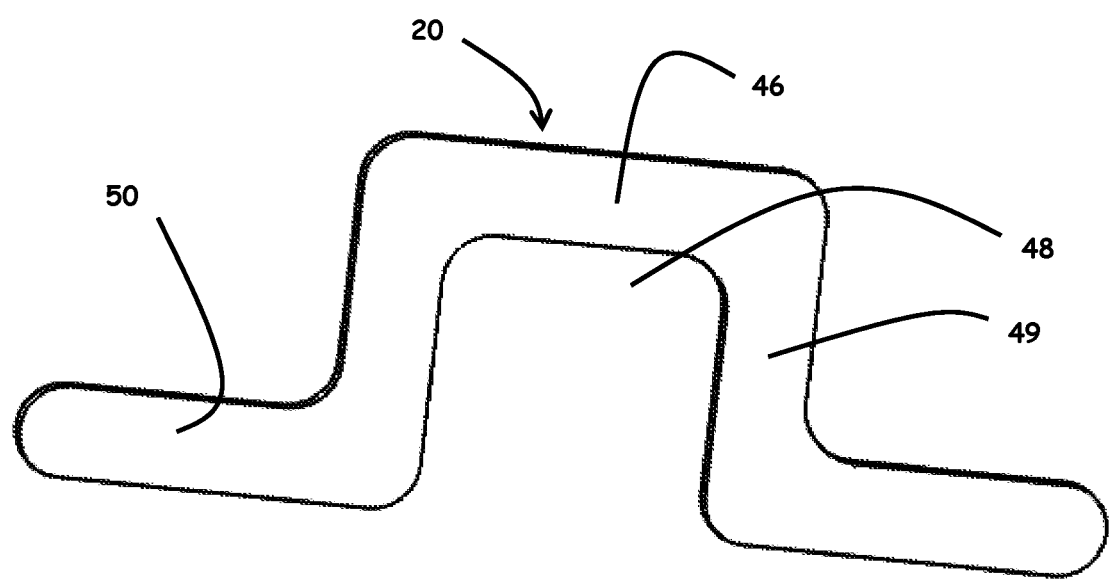
FIG. 3 is an enlarged schematic view of another example wire receiver, the wire receiver includes a wire insert slot that ends at transition slots.
Figure 4:
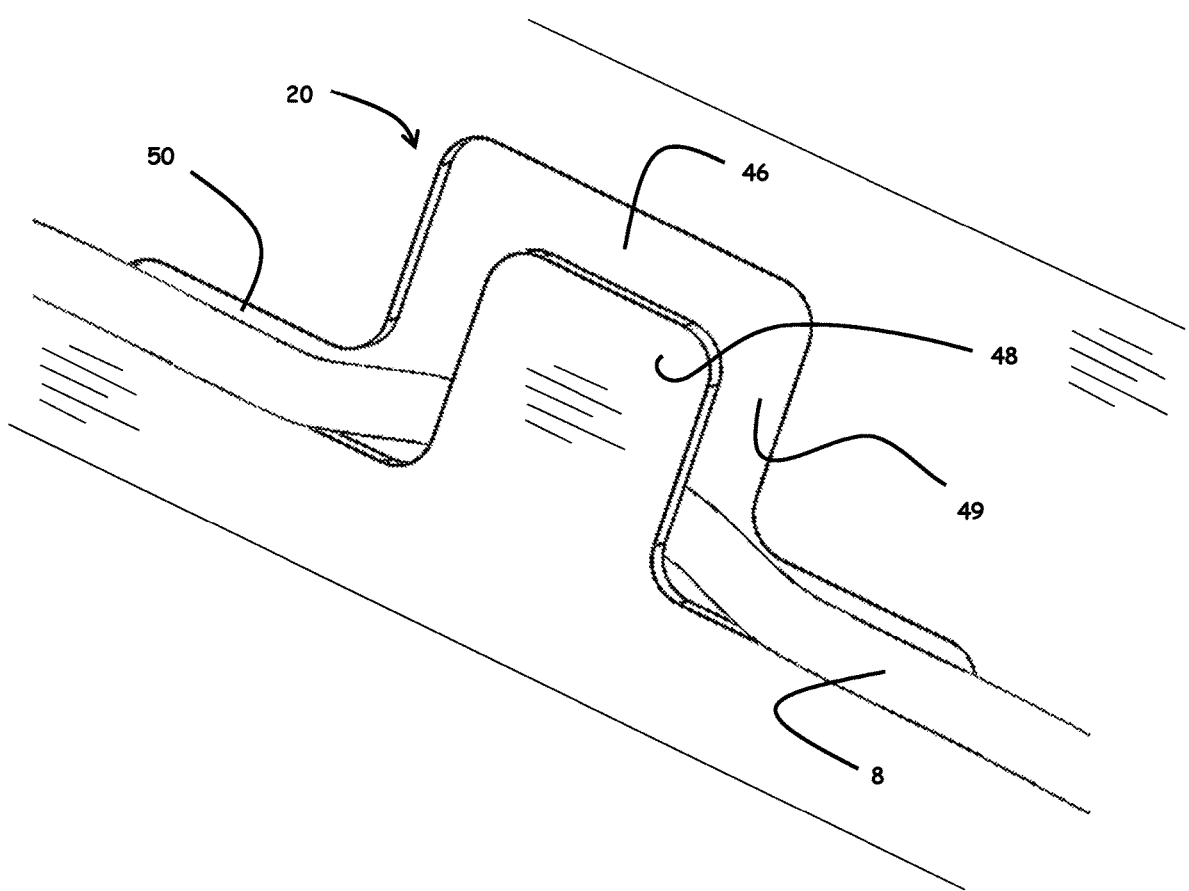
FIG. 4 is an enlarged perspective view of a photovoltaic wire secured in the wire receiver shown in FIG. 3.

The wire receiver 20 shown in FIGS. 3 and 4 includes the wire insert slot 46, two wire transition slots 49, and the wire capture slot 50. The wire transitions slots 49 extend vertically. The wire insert slot 46 extends horizontally and is connected to the wire transition slots 49 to allow wires to move from the wire insert slot 46 to the wire transition slots 49. In this embodiment, the wire insert slot 46 is wide enough to accommodate the bend radius of a wire without the wire insert slot extending past the vertical transition slots on at least one side. In this embodiment, the horizontal insert slot is positioned entirely between the vertical transition slots. In other words, the wire insert slot 46 extends horizontally between but not beyond the wire transition slots 49.

Figure 5:
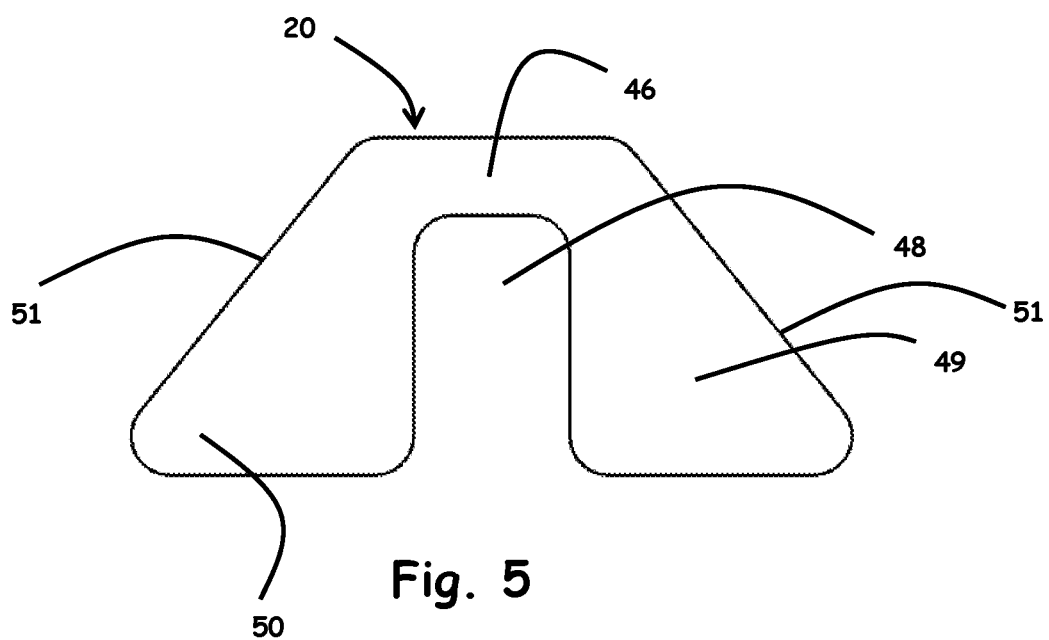
FIG. 5 is an enlarged schematic view of another example wire receiver, the wire receiver includes a trapezoidal slot.
Figure 6:
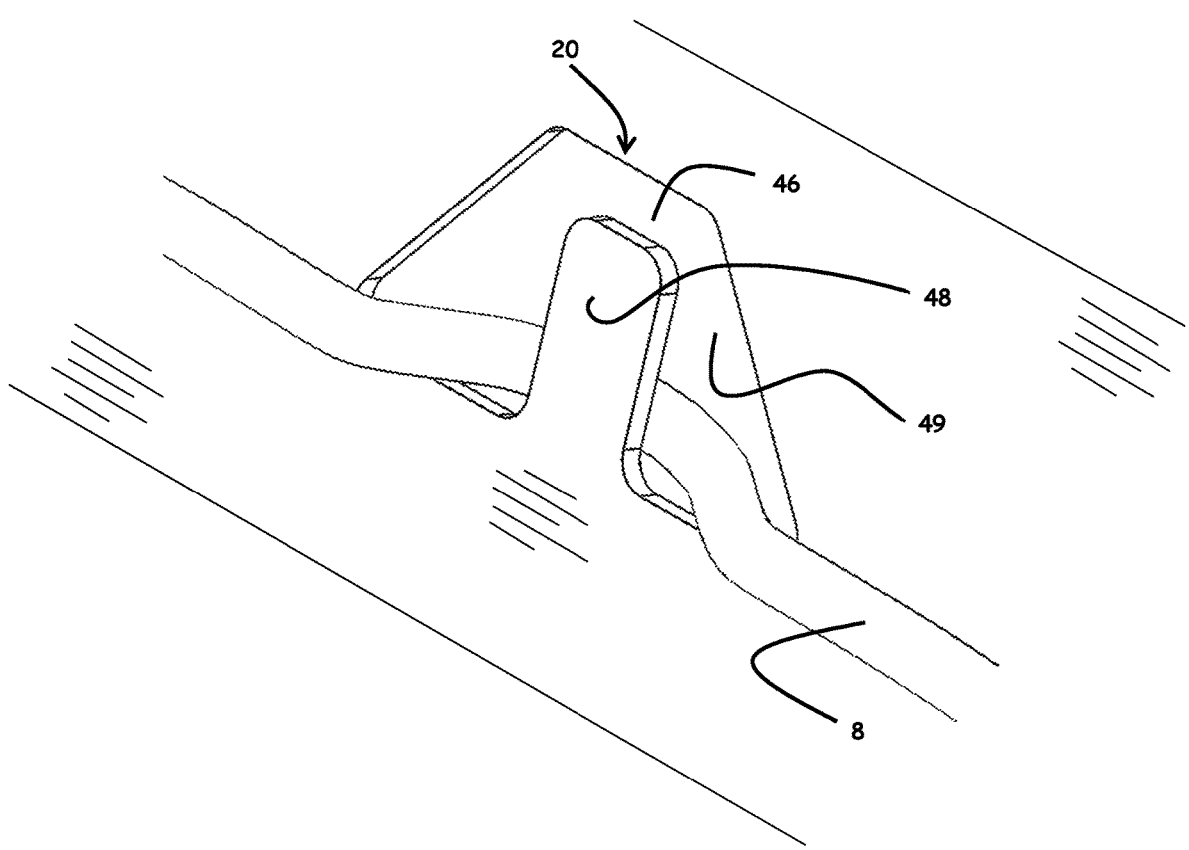
FIG. 6 is an enlarged perspective view of a photovoltaic wire secured in the wire receiver shown in FIG. 5.

The wire receiver 20 shown in FIGS. 5 and 6 includes the wire insert slot 46, two wire transition slots 49, and the wire capture slot 50. The wire insert slot 46 extends between but not beyond the wire transition slots 49. In addition, the wire receiver 20 shown in FIGS. 5 and 6 includes non-parallel side walls 51 providing a non-rectangular shape for the slots 46, 49, 50. In the example, the wire receiver 20 is triangular. The shape of the wire receiver 20 results in a smaller wire insert slot 46 but a larger transition slot 49 and a larger wire capture slot 50 for holding wires. Accordingly, the shape of the wire receiver 20 allows for more wires to be held in the same feature than other embodiments.

Figure 7:
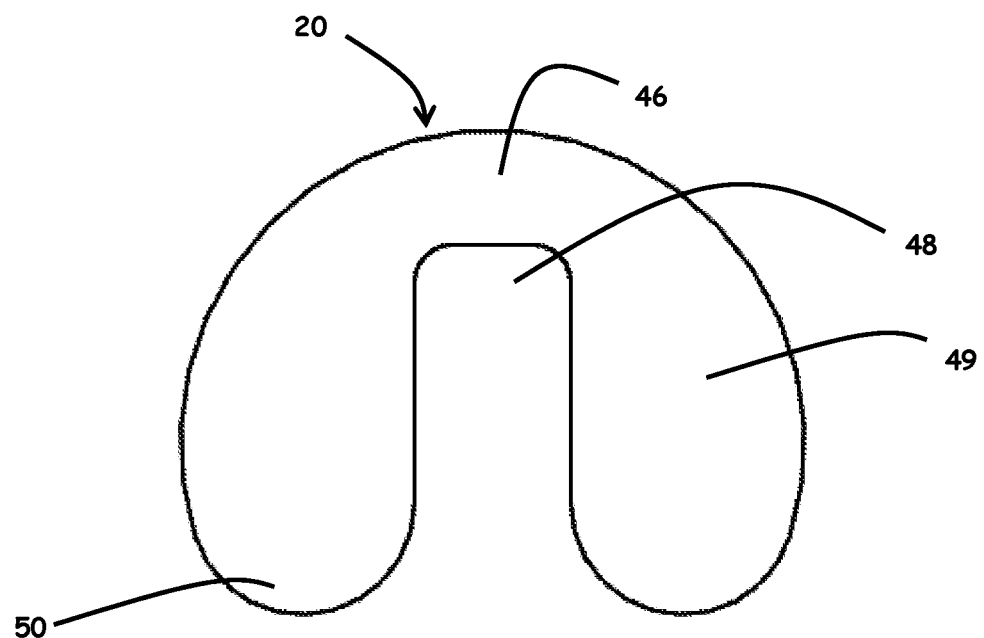
FIG. 7 is an enlarged schematic view of another example wire receiver, the wire receiver having a rounded shape.
Figure 8:
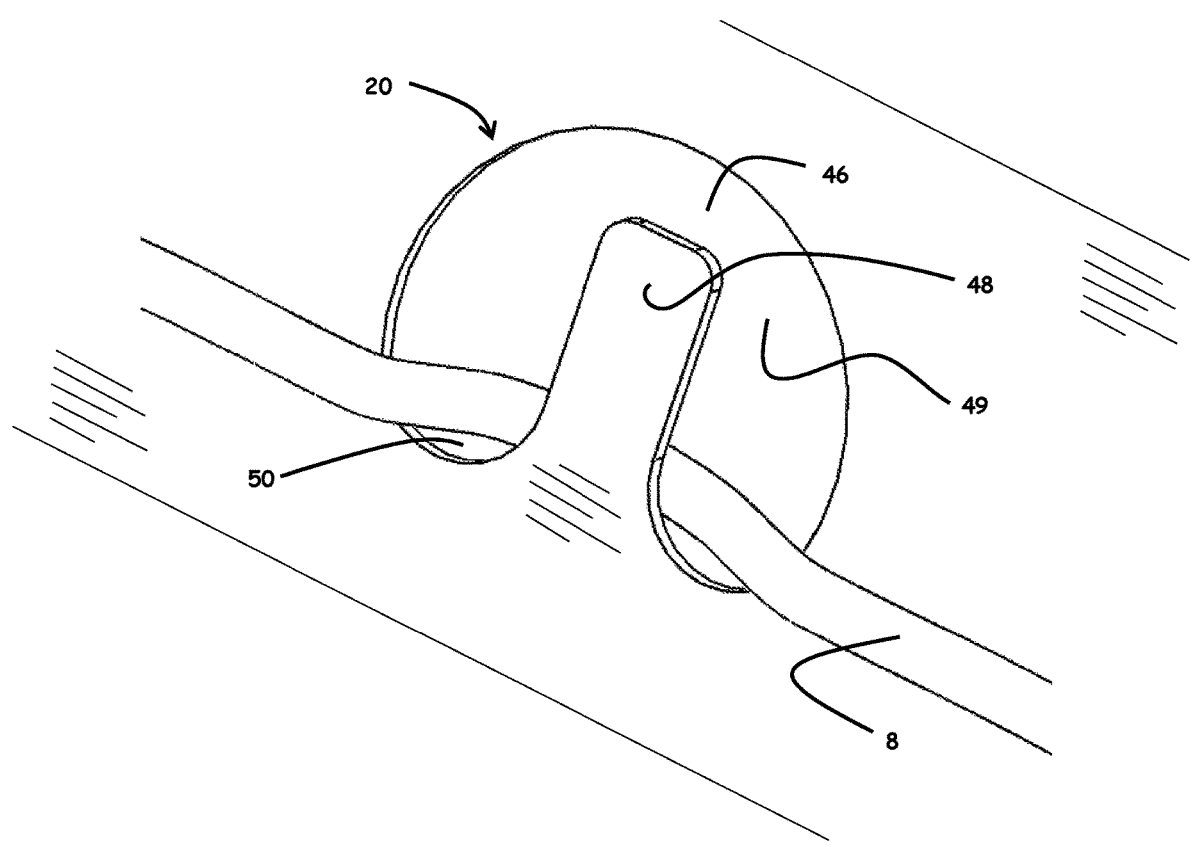
FIG. 8 is an enlarged perspective view of a photovoltaic wire secured in the wire receiver shown in FIG. 7.

The wire receiver 20 shown in FIGS. 7 and 8 includes the wire insert slot 46 and two wire transition slots 49, and the wire capture slot 50. The embodiment shown in FIGS. 7 and 8 is similar to the embodiment shown in FIGS. 5 and 6 but the wire receiver 20 shown in FIGS. 7 and 8 has smooth rounded corners instead of angular corners. Accordingly, the wire receiver 20 is a round shape. As a result, the wire receiver 20 may prevent the wires from being damaged as the wires are inserted or secured in the wire receiver 20. In addition, the embodiment shown in FIGS. 7 and 8 does not include a wire capture slot separate from the wire transition slots 49. Instead, the wires may be secured in the wire transition slots 49 which act as the wire capture slot 50.

Figure 9:
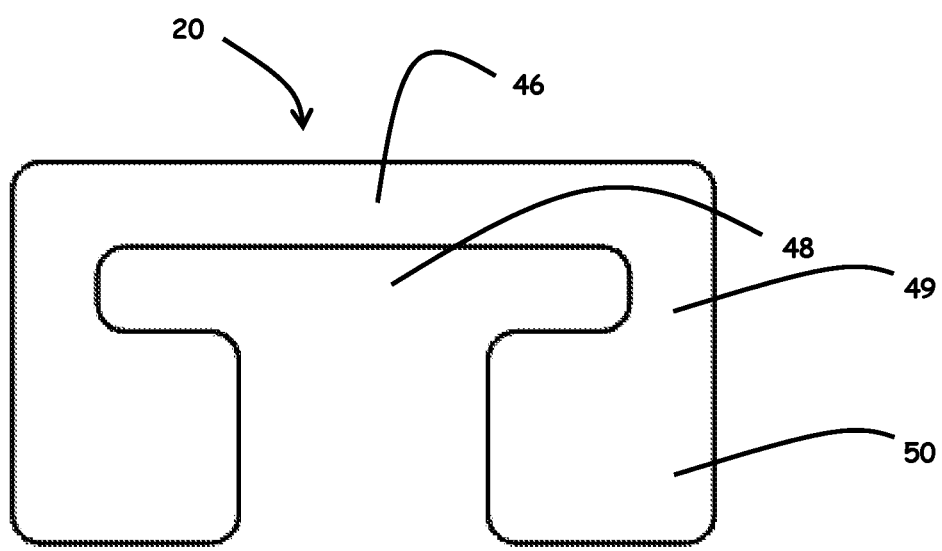
FIG. 9 is an enlarged schematic view of another example wire receiver, the wire receiver includes a T-shaped cleat.
Figure 10:
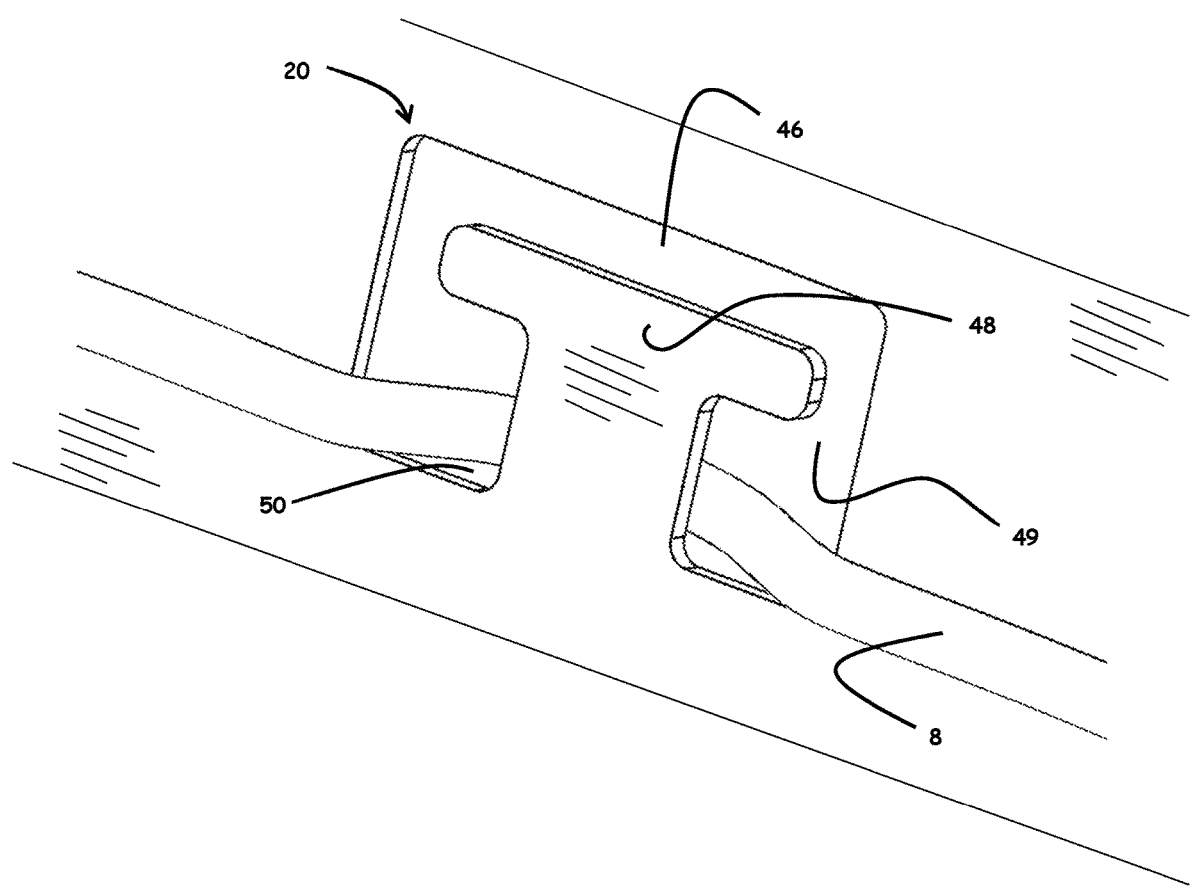
FIG. 10 is an enlarged perspective view of a photovoltaic wire secured in the wire receiver shown in FIG. 9.

The wire receiver 20 shown in FIGS. 9 and 10 includes the wire insert slot 46, two wire transition slots 49, and the wire capture slot 50. The cleat 48 extends vertically through the wire capture slot 50 and between the wire transition slots 49. In this embodiment, the cleat 48 is T-shaped. As a result, the cleat 48 forms a torturous path for a wire to move out of the wire capture slot 50 and through the transition slots 49 and, thereby, inhibits escape of the wires once the wires are held in the wire capture slot 50.

Figure 11:
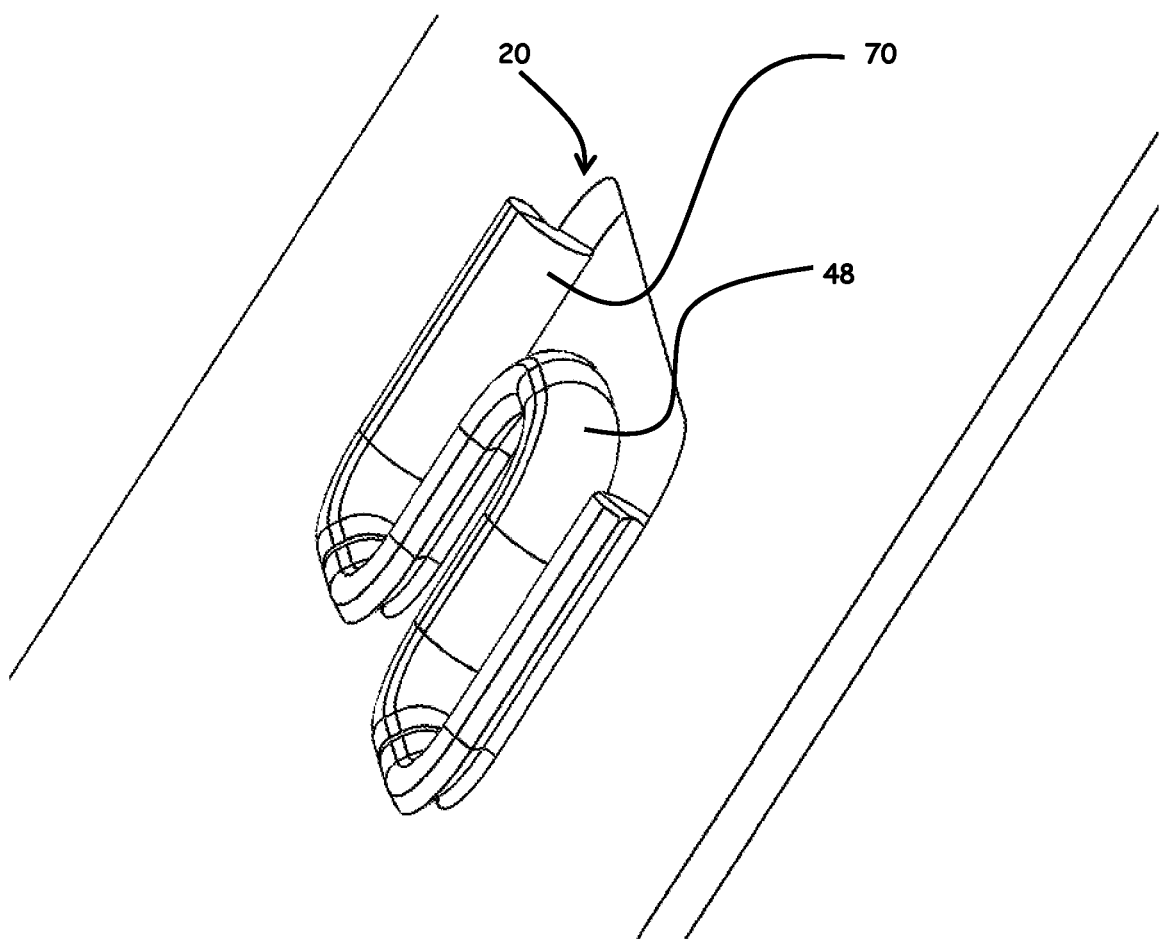
FIG. 11 is an enlarged front perspective view of another example wire receiver, the wire receiver includes rounded edges.
Figure 12:
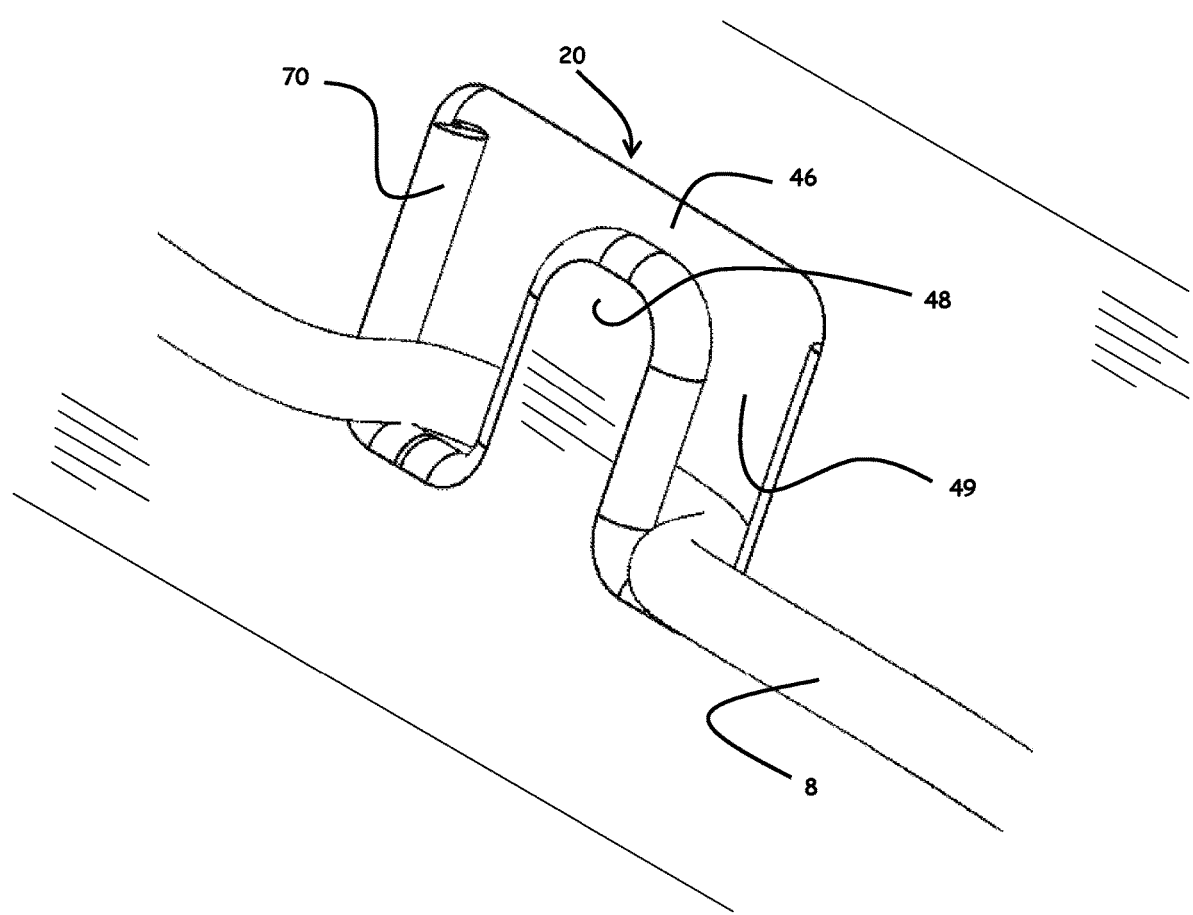
FIG. 12 is an enlarged rear perspective view of a photovoltaic wire secured in the wire receiver shown in FIG. 11.

The wire receiver 20 shown in FIGS. 11 and 12 includes the wire insert slot 46 and two wire transition slots 49. The embodiment shown in FIGS. 11 and 12 is an inverted U-shape with a single center cleat 48. In this embodiment, the wire receiver 20 does not include a wire capture slot 50 separate from the wire transition slots 49. Rather, the wires may be secured directly in the wire transition slots 49, which act as dual purpose slots. Accordingly, a wire may be more loosely captured than embodiments including a separate wire capture slot 50. Also, the embodiment shown in FIGS. 11 and 12 is a simplified shape that is narrower than other embodiments and allows for tighter space applications.

In addition, the wire receiver 20 shown in FIGS. 11 and 12 includes rounded edges or fillets 70 on the portion of the support structure defining the wire receiver 20 to protect the wires from damage when the wires are captured in the wire receiver 20. The rounded edges 70 could be applied to any embodiments shown and described herein.

Other embodiments of the wire receivers 20 could include multiple vertical and horizontal fingers 47 or cleats 48 to create many different slots or combination of slots. Multiple fingers 47 or cleats 48 could be provided with any of the embodiments shown or described.

FIGS. 13-17 show an example of a support structure 3 that may incorporate any of the embodiments of the wire receiver 20 shown or described. The support structure 3 supports modules 1 above the ground at a fixed angle. The support structures 3 may be positioned on the ground and arranged for the modules 1 to be ground mounted, i.e., the modules 1 do not need to be mounted on a structure.

Figure 14:
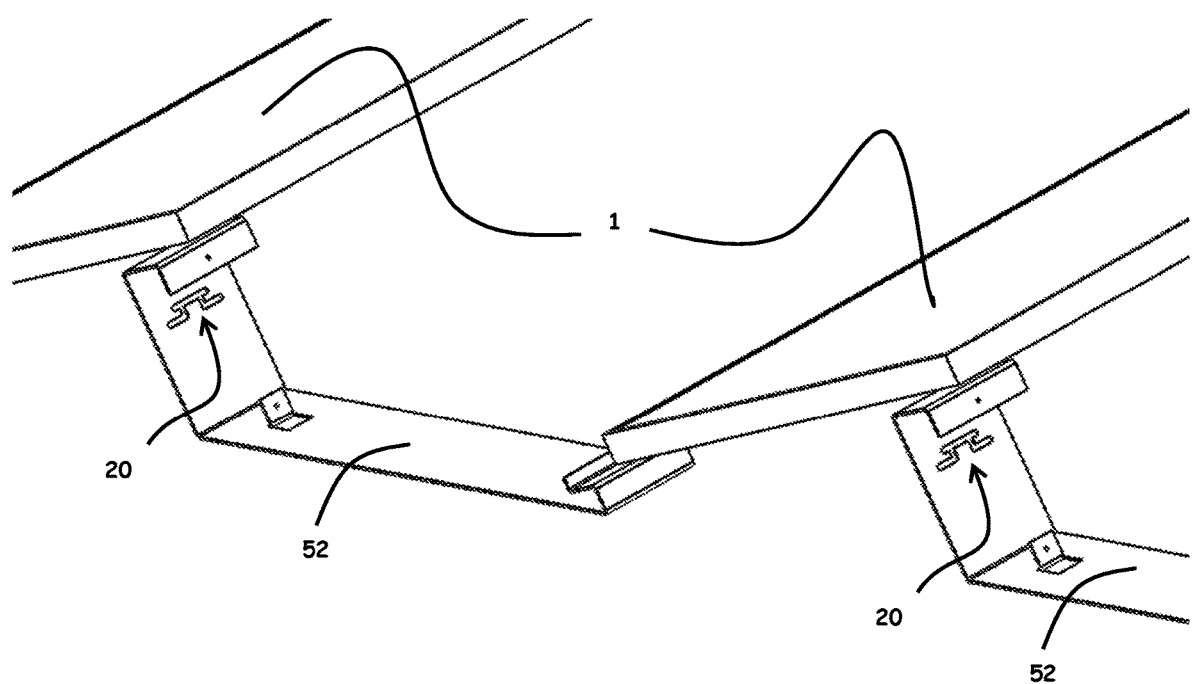
FIG. 14 is an enlarged perspective view of a portion of the solar array shown in FIG. 13, and illustrating wire receivers on a support of the solar array.

For example, FIG. 14 shows wire receivers 20 on a support 52 of the solar array. The wire receivers 20 are positioned on the support 52 adjacent the modules 1 at a distance above the mounting surface. Accordingly, the wire receivers 20 are arranged to secure photovoltaic wires and hold the wires above the mounting surface.

Figure 15:
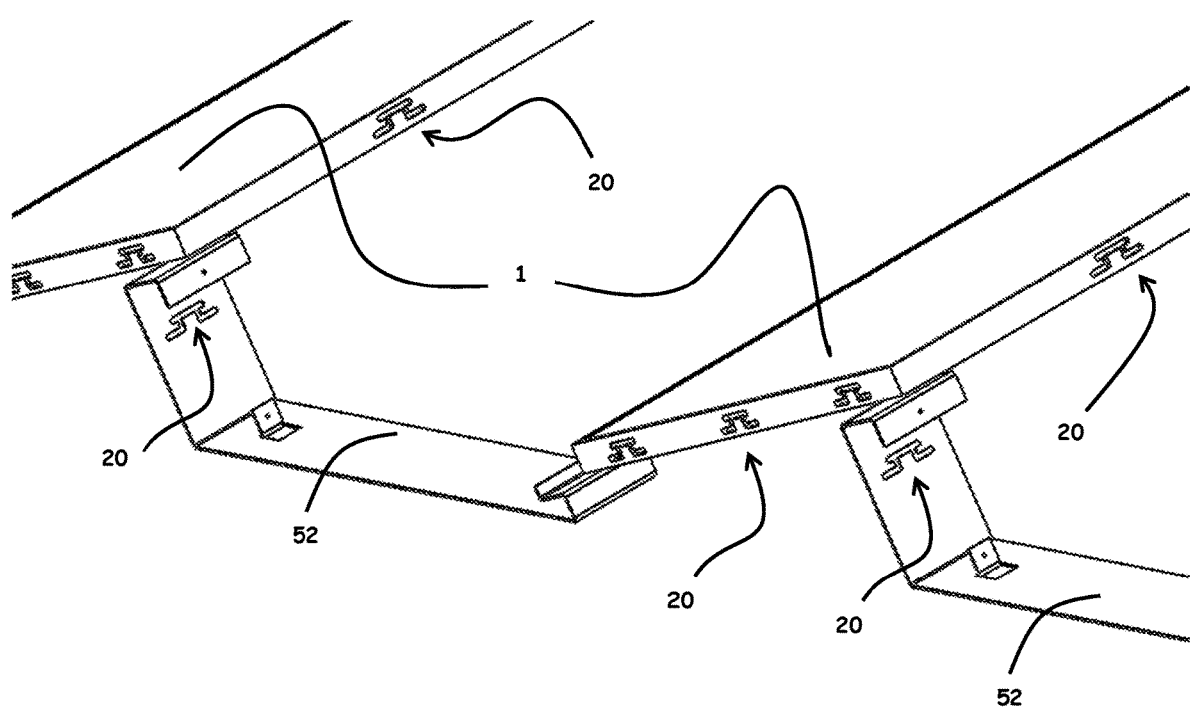
FIG. 15 is an enlarged perspective view of a portion of the solar array shown in FIG. 13, and illustrating wire receivers on a module of the solar array.

FIG. 15 shows wire receivers positioned on the supports 52 of the solar array and on the modules 1. The wire receivers 20 may be located on the laminate, frame, or other component of the modules 1. In the example, the wire receivers 20 are located along an edge of the modules 1. The wire receivers 20 may also be located on an upper or lower surface of the module 1 or elsewhere on the module.

Figure 16:
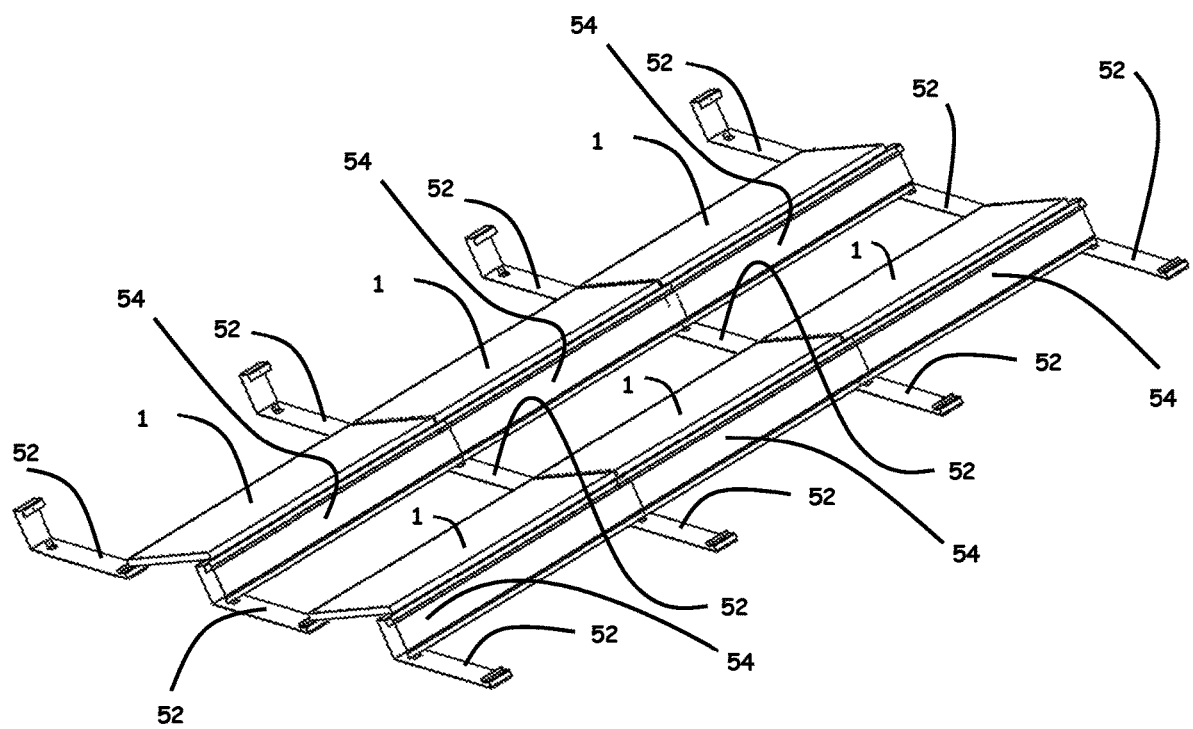
FIG. 16 is a perspective view of a portion of another example solar array, the solar array includes deflectors.
Figure 17:
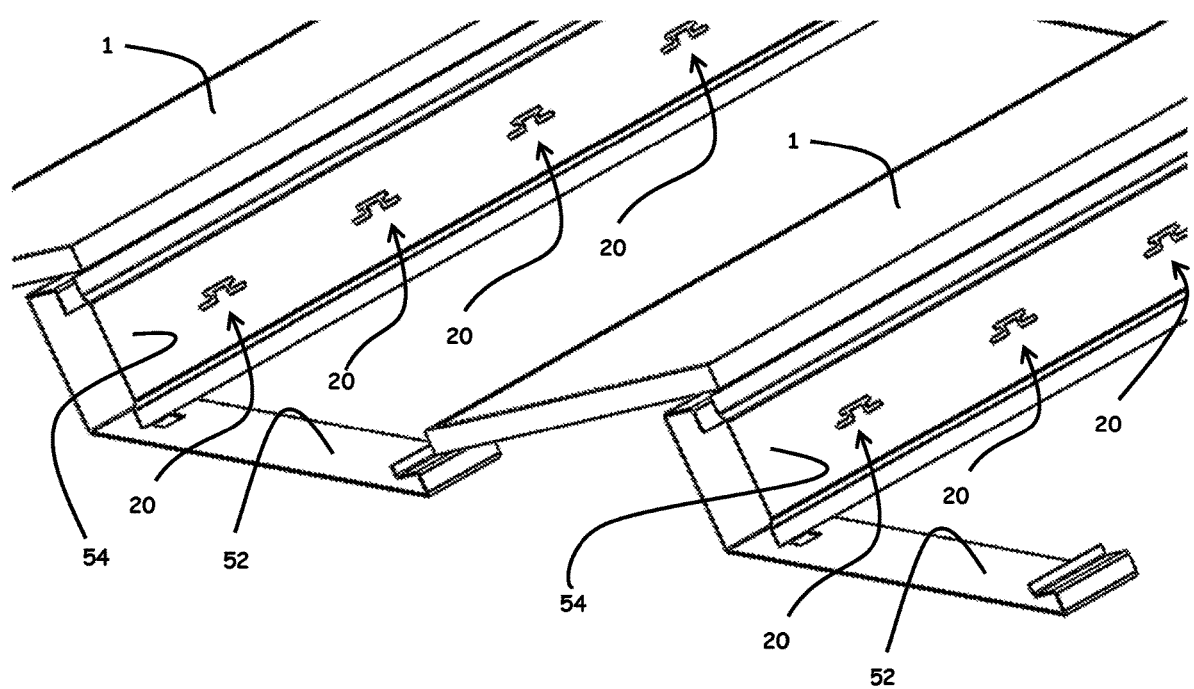
FIG. 17 is an enlarged perspective view of a portion of the solar array shown in FIG. 16, and illustrating wire receivers on the deflectors of the solar array.

FIG. 16 shows a portion of a solar array including deflectors or wire trays 54. Wire receivers 20 may be located on the deflectors 54 as shown in FIG. 17. The wire receivers 20 are spaced apart along the longitudinal axes of the deflectors 54 and arranged to secure the wires to the deflectors 54.

FIGS. 18-24 show a solar array that includes a support structure 56 allowing the modules 1 to be positioned relative to a surface 58. Accordingly, the modules 1 are able to track the sun's movements throughout at least a portion of the day and increase the generated energy. For example, the support structure 56 includes a main support beam 62 which is a tracker torque tube mounted to a pier 60. The tube 62 rotates relative to the pier 60 to adjust the position of the modules 1 relative to the surface 58. The support structure 56 may include an actuator assembly that controls movement of the solar modules. The actuator assembly may be controlled by a controller that determines a position of the solar module and operates the actuator assembly to move the solar modules to a position that generates an increased amount of solar energy. In other embodiments, the support structure is static and does not track the sun.

The support structure 56 includes piers 60, at least one main support beam 62, module rail support beams 64, and module rails 66. The modules 1 are mounted on the module rails 66 which are supported by the module rail support beams 64. The module rail support beams 64 are supported be the main support beam 62. The main support beam 62 is attached to the piers 60 which support the modules 1 at a distance above the surface 58. The wire receivers 20 may be incorporated into any of the piers 60, the main support beam 62, the module rail support beams 64, the module rails 66, and the modules 1 or any other member of the solar array's structure.

Figure 22:
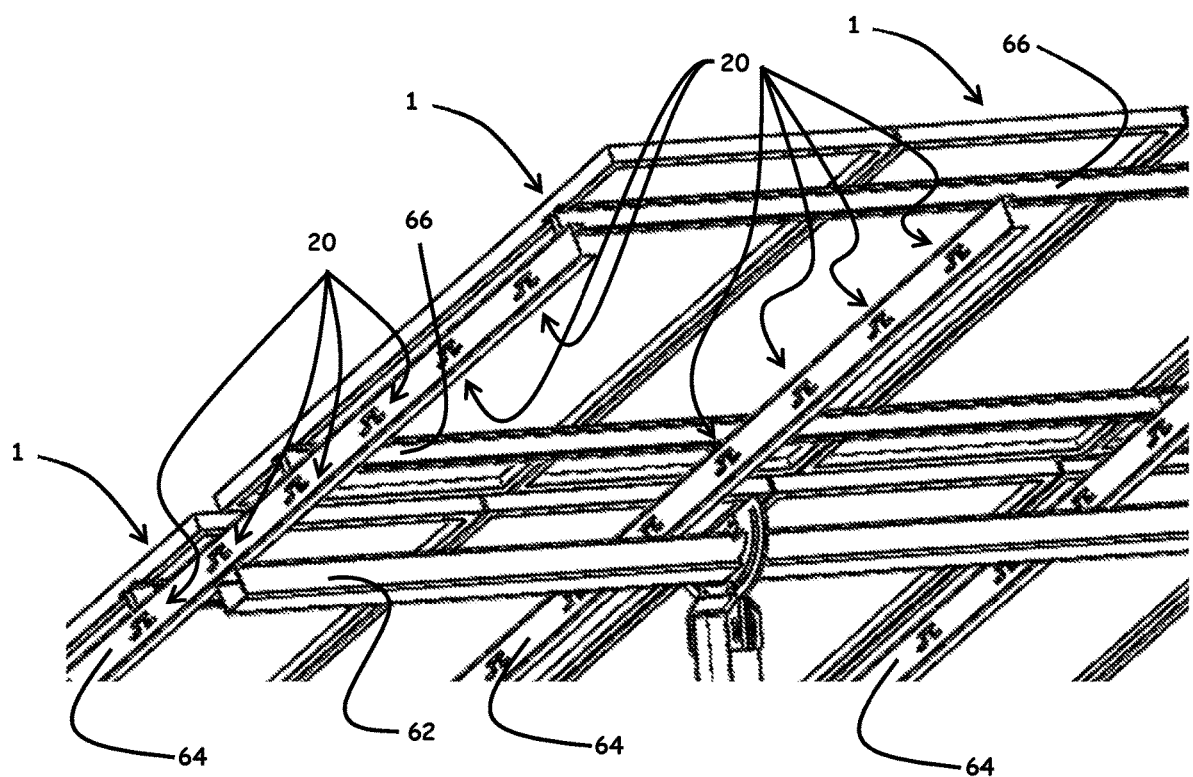
FIG. 22 is an enlarged perspective view of a portion of the solar array shown in FIG. 18, and illustrating wire receivers on beams of the solar array.

FIGS. 18 and 22 show the wire receivers 20 incorporated into the module rail support beams 64. The wire receivers 20 are arranged at predetermined locations along the longitudinal axes of the beams 64 such that wire receivers 20 of adjacent beams 64 are aligned in rows and the wire receivers 20 are positioned to receive wires of the modules 1 supported by the support structure 56.

Figure 19:
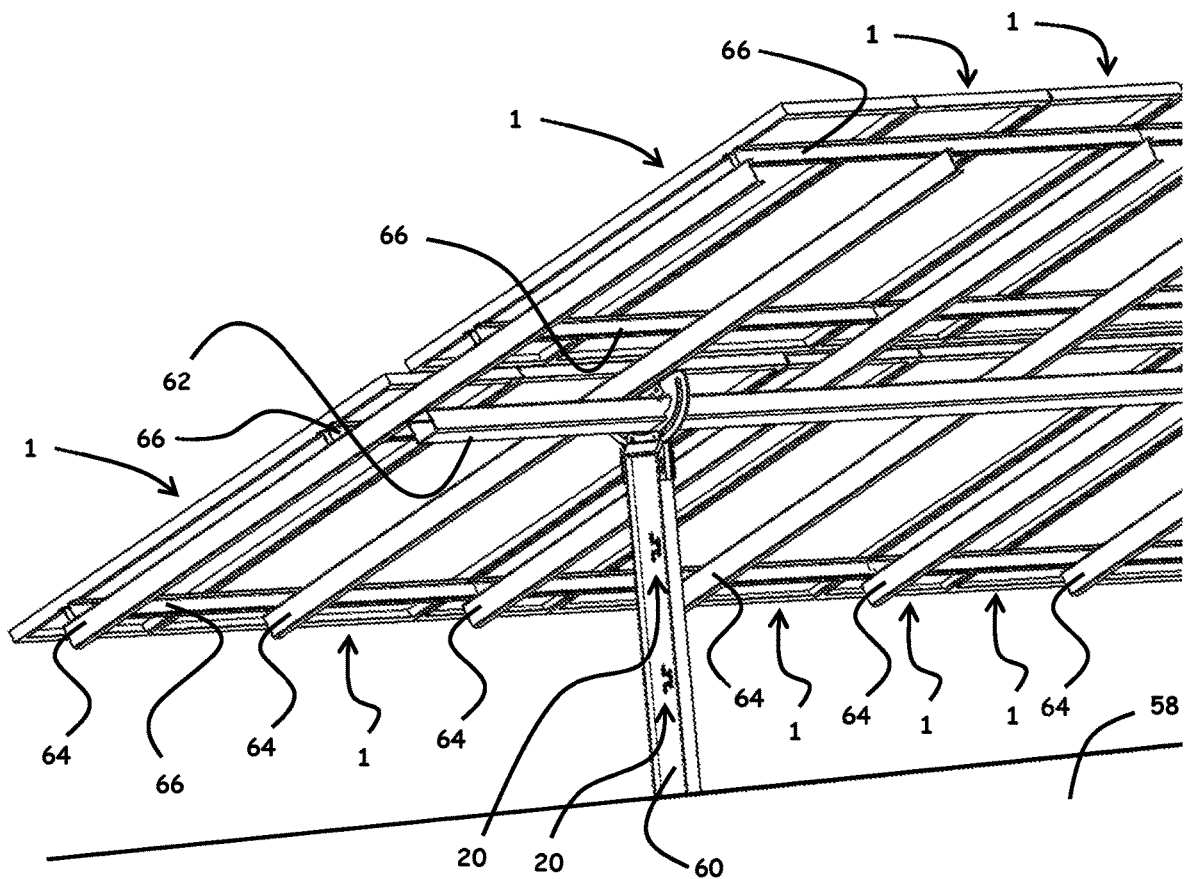
FIG. 19 is an enlarged perspective view of a portion of the solar array shown in FIG. 18, and illustrating wire receivers on a pier of the solar array.

FIG. 19 shows the wire receivers 20 incorporated into the piers 60. The wire receivers 20 are spaced apart vertically along the piers 60 and arranged such that the wire receivers 20 secure wires extending from the modules 1 downward along the piers 60 to the ground. Notably, the wire insert slots 46 (labeled in FIG. 1) and the wire capture slot 50 (labeled in FIG. 1) are parallel to the longitudinal axis of the pier 60 and perpendicular to the surface 58. The wire transition slots 49 (labeled in FIG. 1) are perpendicular to the longitudinal axis of the pier 60 and parallel to the surface 58.

Figure 20:
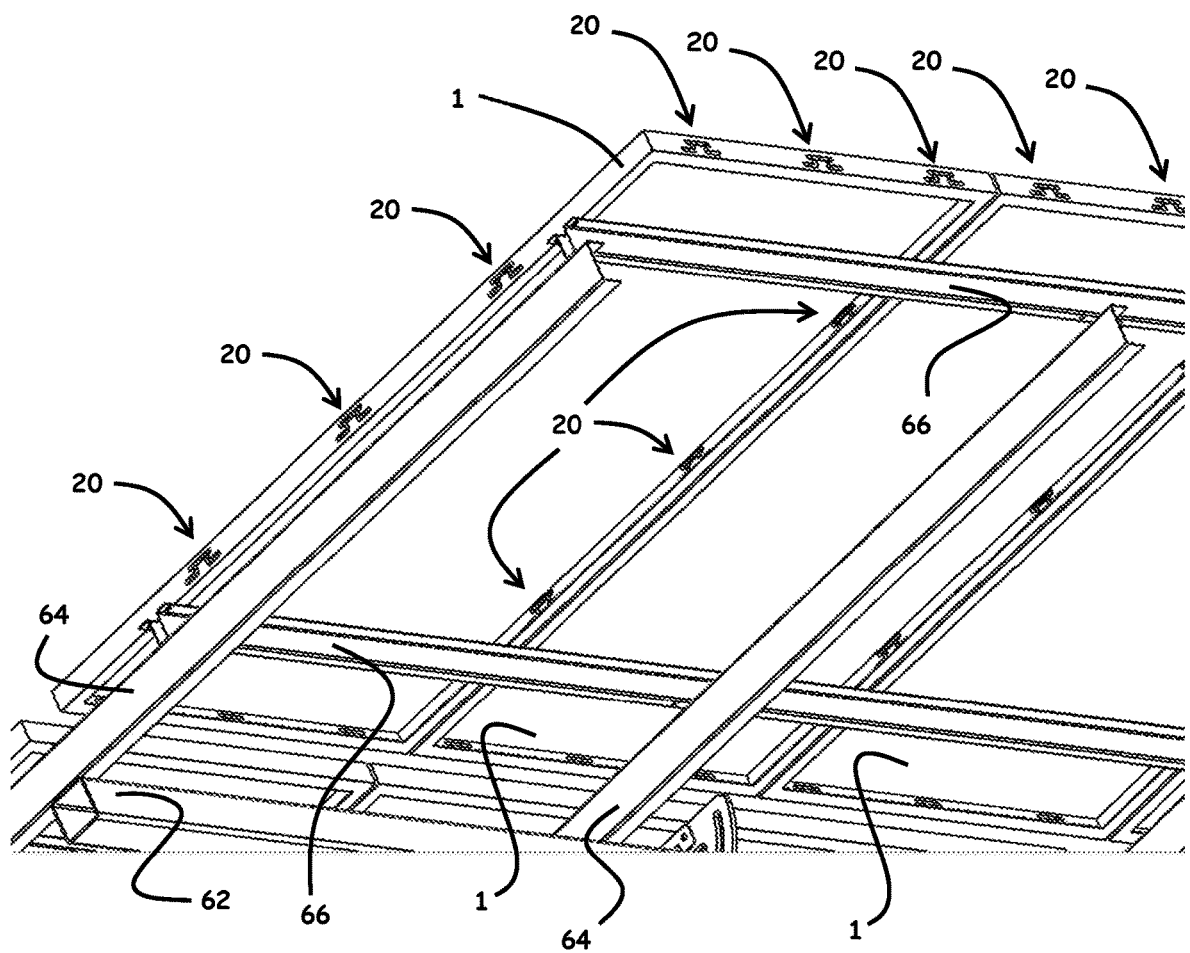
FIG. 20 is an enlarged perspective view of a portion of the solar array shown in FIG. 18, and illustrating wire receivers on modules of the solar array.

FIG. 20 shows the wire receivers 20 incorporated into the modules 1. The wire receivers 20 are located on inward facing edges and outward facing edges of the modules 1. Accordingly, the wire receivers 20 are positioned to receive wires that are connected on an inner or outer location of the modules 1. Moreover, the wire receivers 20 accommodate the wires being secured in multiple different positions on the modules 1.

Figure 21:
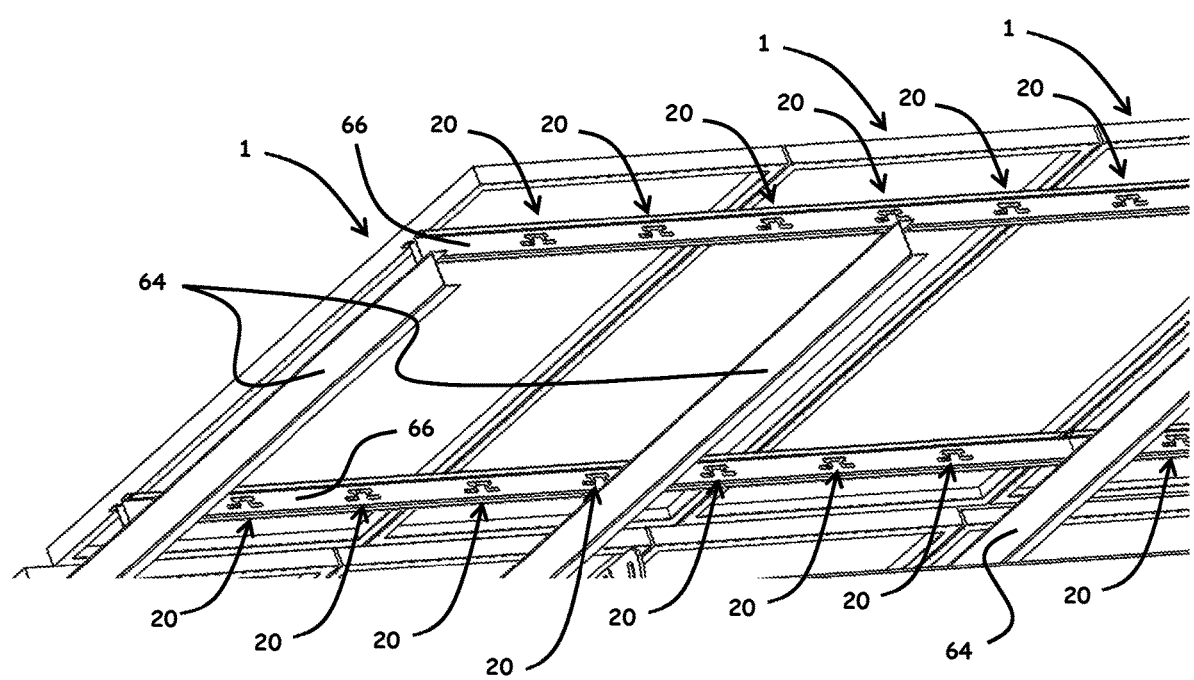
FIG. 21 is an enlarged perspective view of a portion of the solar array shown in FIG. 18, and illustrating wire receivers on rails of the solar array.

FIG. 21 shows the wire receivers 20 incorporated into the module rails 66. The wire receivers 20 are arranged at predetermined locations along the longitudinal axes of the module rails 66. The wire receivers 20 are positioned to receive wires from the modules 1 when the modules 1 are mounted to the module rails 66.

Figure 23:
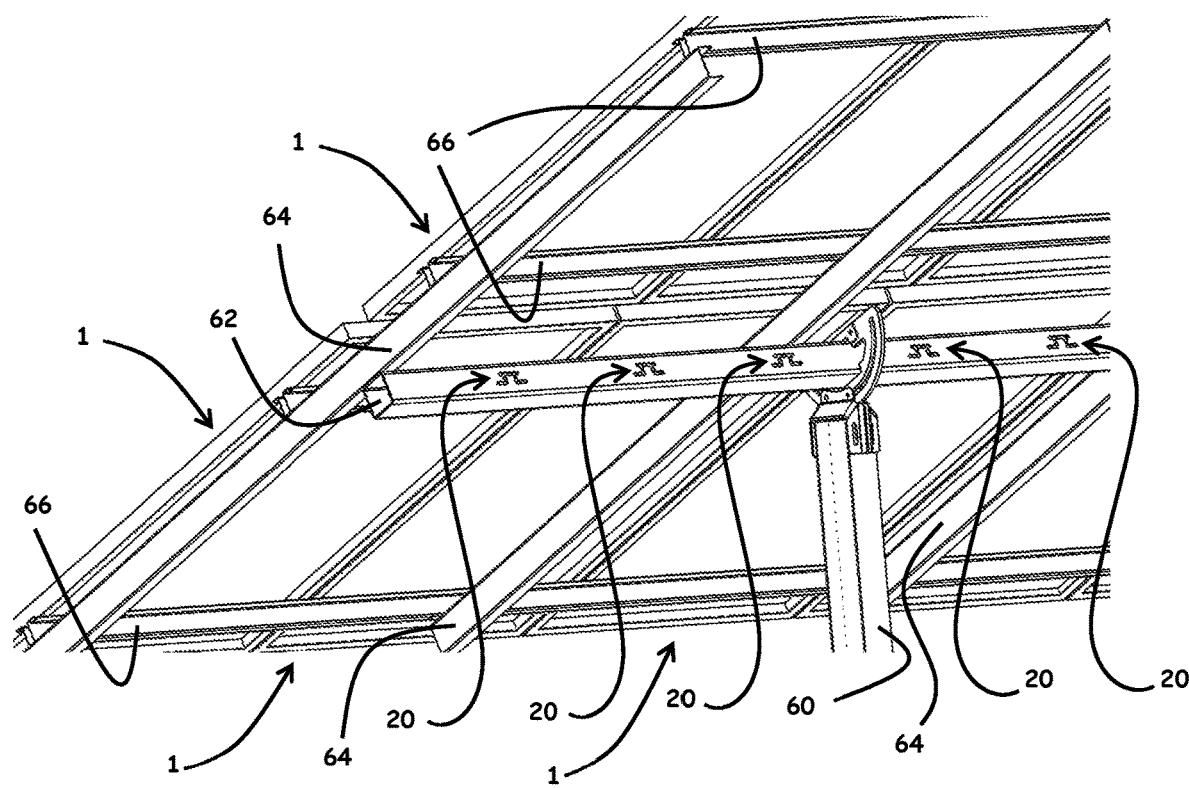
FIG. 23 is an enlarged perspective view of a portion of the solar array shown in FIG. 18, and illustrating wire receivers on a support beam of the solar array.

FIG. 23 shows the wire receivers 20 incorporated into the main support beam 62. The wire receivers 20 are arranged at predetermined locations along the longitudinal axes of the main support beam 62. Accordingly, the wire receivers 20 are able to secure wires extending from the modules 1 to the pier 60. The wire receivers 20 may be sized to secure multiple wires and allow the wire receivers 20 on the main support beam 62 to secure wires from all of the modules 1.

Figure 24:
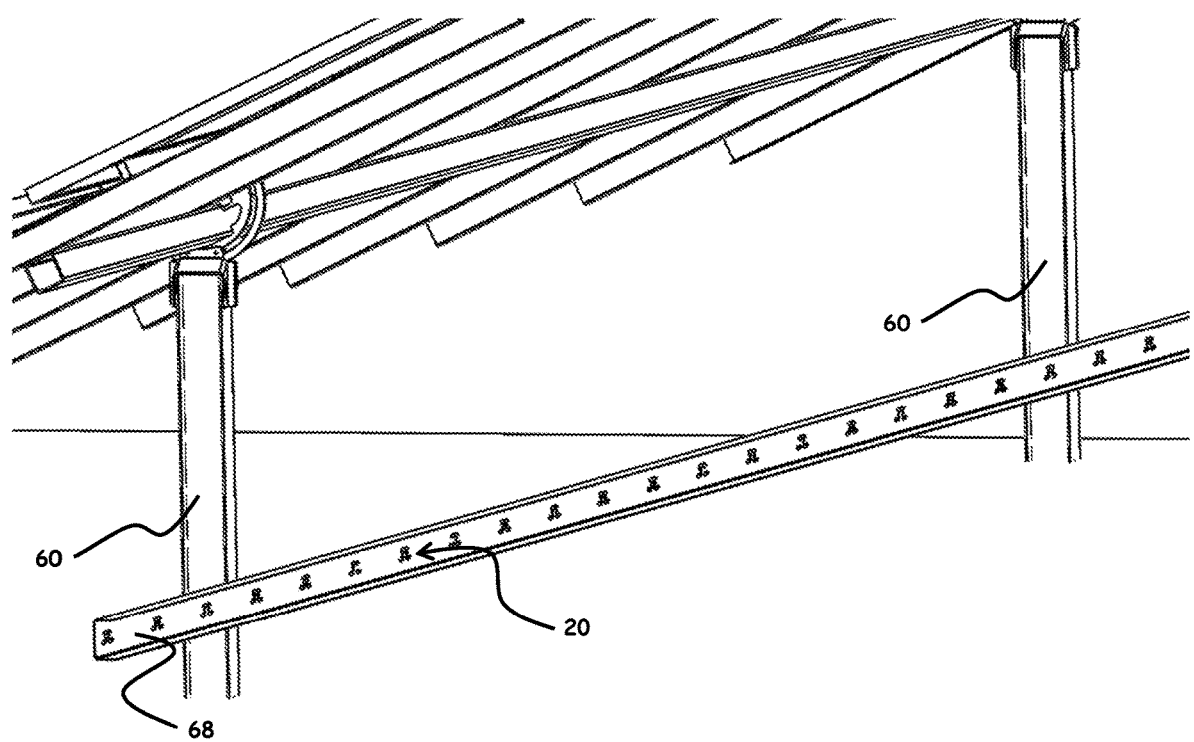
FIG. 24 is an enlarged perspective view of a portion of the solar array shown in FIG. 18, and illustrating wire receivers on a wire tray of the solar array.

FIG. 24 shows the wire receivers 20 incorporated into a wire tray 68 of the solar array. The wire tray 68 may be attached to the piers 60 or other components of the support structure 56 as shown in FIG. 24 or may be separate from the support structure 56. The wire tray 68 may carry the wires to a controller or power system within the footprint of the solar array or remote from the solar array.

The support structures of the solar arrays shown in FIGS. 13 and 18 and the support structures described above are able to incorporate the wire receivers 20 described and shown herein. For example, the supports structures include members, such as beams, braces, rails, piers, and poles that can have integrated wire receivers according to the embodiments shown and described herein. The wire receivers 20 may be stamped, cut, pressed, and/or otherwise formed in the members of the support structures. One or more members of the support structure may include one or more of the wire receivers 20. The wire receivers 20 may be positioned at predetermined spacing along the length of the support structure and arranged to receive wires from one or more of the modules 1 supported by the support structure.

FIGS. 13 and 18 show examples of modules 1 supported by support structures 3, 56. There may be many more types of support structures and solar arrays that implement aspects of the disclosure. For example, some support structures support the modules 1 at a distance above the surface 58 sufficient to fit at least some vehicles underneath. In addition, the solar arrays are arranged to at least partially shield objects underneath from the environment. Accordingly, such solar arrays may function as carports and are able to incorporate the wire receivers 20 described and shown herein.

Embodiments of the methods and systems described achieve superior results compared to prior methods and systems. For example, the systems and methods described simplify the installation of solar modules on structures. More specifically, the embodiments reduce the labor, tools, and materials required for layout and assembly of the solar modules. In addition, the embodiments allow wires to be easily secured during assembly.

When introducing elements of the present invention or the embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A solar array comprising:
 a solar module; and
 a support structure for the solar module, the support structure including a support member, wherein the solar module is mounted on the support structure such that the solar module is positioned at least partially above the support member;
 a wire receiver for securing wires to the solar module or the support member, the wire receiver comprising:
  a wire insert slot sized for receiving wires;
  a wire capture slot;

a wire transition slot connected to the wire insert slot and the wire capture slot, wherein the wire transition slot extends perpendicular to the wire insert slot and the wire capture slot and is sized for the wires to move from the wire insert slot through the wire transition slot to the wire capture slot; and a catch extending across the wire capture slot and dividing the wire capture slot into at least two portions, the catch adapted to inhibit movement of the wires, wherein the wire insert slot and the wire transition slot are sized and arranged for the wires to be inserted into the wire insert slot and positioned around the catch.

2. The solar array of claim 1 wherein the catch is positioned to engage wires in the wire capture slot such that the catch provides a friction force that inhibits movement of the wires when the wire contacts the catch.

3. The solar array of claim 1, wherein the wire transition slot is a first wire transition slot, the wire receiver further comprising a second wire transition slot connecting the wire insert slot to the wire capture slot and extending parallel to the first wire transition slot, wherein the first and second wire transition slots are sized and arranged for the wires to move from the wire insert slot through the first and second wire transition slots to the wire capture slot.

4. The solar array of claim 3, wherein the wire insert slot and the wire capture slot are horizontal slots, and wherein the first and second wire transition slots are vertical slots.

5. The solar array of claim 4, wherein the first and second wire transition slots extend on opposite sides of the catch.

6. The solar array of claim 4, wherein the wire receiver includes horizontal fingers to facilitate securing the wires around the catch, wherein the horizontal fingers extend perpendicular to the catch and between the wire insert slot and the wire capture slot.

7. The solar array of claim 1, wherein the wire capture slot is sized to receive multiple wires.

8. The solar array of claim 1, wherein the wire receiver is located on the support member, the support member being made of metal or plastic.

9. The solar array of claim 8, wherein the wire receiver is integrally formed with the support member.

10. The solar array of claim 1, wherein the wire receiver is located on a frame of the solar module.

11. The solar array of claim 1, wherein the solar module or the support member includes a planar surface including the wire receiver.

12. The solar array of claim 11, wherein an edge along the planar surface defines the wire insert slot and the wire transition slot, wherein the edge includes a fillet with a radius sized to prevent damage to the wires.

13. The solar array of claim 1 further comprising tubing secured in the wire receiver.

14. A method of assembling a solar array, the method comprising:

mounting a solar module on a support structure including a support member, wherein the solar module extends at least partially above the support member;

connecting wires to the solar module; and securing the wires in a wire receiver, the wire receiver including a wire insert slot, a wire capture slot, a wire transition slot connected to the wire insert slot and the wire capture slot, and a catch extending across the wire capture slot and dividing the wire capture slot into at least two portions, the catch adapted to inhibit movement of the wires, wherein the wire transition slot extends perpendicular to the wire insert slot and the wire capture slot and is sized for the wires to move from the wire insert slot through the wire transition slot to the wire capture slot.

15. The method of claim 14, wherein securing the wires in the wire receiver comprises inserting each wire into the wire insert slot above the catch and moving each wire downward through the wire transition slot into the wire capture slot such that the catch provides a friction force that inhibits movement of the wires.

16. The method of claim 14, wherein securing the wires in the wire receiver comprises inserting each wire into the wire insert slot and moving each wire through the wire transition slot into the wire capture slot.

* * * * *